(12) United States Patent
Avery

(10) Patent No.: US 6,657,549 B1
(45) Date of Patent: Dec. 2, 2003

(54) LOCATION FINDING SYSTEM AND METHOD

(75) Inventor: David M. Avery, Woking (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 484 days.

(21) Appl. No.: 09/631,361

(22) Filed: Aug. 2, 2000

(30) Foreign Application Priority Data

Aug. 5, 1999 (GB) .............................................. 9918348

(51) Int. Cl.[7] .................................................. G08B 5/22
(52) U.S. Cl. .................... 340/825.49; 340/569; 342/419
(58) Field of Search ........................... 340/825.49, 569; 342/457, 419

(56) References Cited

U.S. PATENT DOCUMENTS

| | | | |
|---|---|---|---|
| 5,485,163 A | 1/1996 | Singer et al. ................. | 342/357 |
| 6,114,971 A | * | 9/2000 | Nysen .................... 340/825.54 |
| 6,459,704 B1 | * | 10/2002 | Jandrell ...................... 370/445 |

FOREIGN PATENT DOCUMENTS

| | | | |
|---|---|---|---|
| EP | 0851239 A1 | 7/1998 | ........... G01S/13/87 |
| WO | WO9733386 | 9/1997 | ............ H04H/7/26 |

* cited by examiner

Primary Examiner—Michael Horabik
Assistant Examiner—M Shimizu
(74) Attorney, Agent, or Firm—Jack D. Slobod

(57) ABSTRACT

A method of locating an article or person employs at least one transponding station (TS1) having its own radio identity carded by a person or article in the radio coverage area of a radio system. The system employs a plurality of clusters of spatially separate radio units (M1 to M7) having transceivers and received signal strength determining modules, each of the radio units having an individual identity. Each cluster is associated with a network interrogating station (NIU(1), NIU(2)) employing transceivers for communicating with at least the radio units in its cluster. A central station (10) has a transceiver for communicating with a plurality of the interrogating stations and storage for storing a database encompassing the locations of the radio units (M1 to M7).

2 Claims, 3 Drawing Sheets

LOCATION FINDING SYSTEM AND METHOD

BACKGROUND OF THE INVENTION

1. Field of the invention

The present Invention relates to an article or person location finding system and method.

2. Description of the Related Art

Many methods of locating articles and persons are known. A relatively coarse location method making use of the cellular telephone system is to determine the location of the base station through which a call is being handled. This will give an indication of the cell in which the caller is located. Typically a cell may be say 20 km across in a lower frequency operating system and significantly less in a microcellular system operating at low power at a higher frequency of the order of 1.8 or 1.9 GHz. If a GPS satellite receiver is integrated with a cellular telephone, position can be determined to an accuracy of about 100 m.

WO-A-97 33 386 discloses a location detecting system in which the location of a cellular telephone terminal can be found by the terminal transmitting base station identifications together with electric field strengths of the received radio waves of a plurality of base stations to a position management station which determines the location of the terminal by using the relationship between the electric field strength and the distance between the transmitting points and the receiving point.

A disadvantage of these Known systems is that they require the user to be carrying and using a relatively expensive terminal unit. This makes the system expensive to implement for article tracing or for applications such as automatically tracking or finding children who would not be entrusted with a cellular telephone terminal.

SUMMARY OF THE INVENTION

An object of the present invention is to provide a location system having a relatively inexpensive transponding unit.

According to one aspect of the present invention there is provided a radio system comprising a plurality of clusters of spatially separate radio units having transceiving means and received signal strength determining means, each of the radio units having an individual identity, each cluster being associated with an interrogating station comprising transceiving means for communicating with at least the radio units in its cluster, a central station having transceiving means for communicating with a plurality of the interrogating stations and storage means for storing a database comprising the locations of the radio units, and at least one transponding station having transceiving means and its own radio identity, whereby when it is required to determine the location of the transponding station the central station transmits an enquiry signal including its radio identity to the interrogating stations which rebroadcast the enquiry signal, the transponding station in response to hearing its radio identity in an enquiry signal transmits a reply signal including its own radio identity, the radio units in response to identifying the transponding station determine the received signal strength, and each of the radio units relaying the radio identity and the determined received signal strength together with its own identity to at least one of the interrogating stations which relays the information to the central station which computes the location of the transponding station relative to the positions of the radio units.

According to a second aspect of the present invention there is provided a method of locating at least one transponding station having its own radio identity in the radio coverage area of a radio system comprising a plurality of clusters of spatially separate radio units having transceiving means and received signal strength determining means, each of the radio units having an individual identity, each cluster being associated with an interrogating station comprising transceiving means for communicating with at least the radio units in its cluster, and a central station having transceiving means for communicating with a plurality of the interrogating stations and storage means for storing a database comprising the locations of the radio units, wherein when it is required to determine the location of the transponding station, the central station transmits an enquiry signal to the interrogating stations which in turn broadcast the enquiry signal, the transponding station in response to hearing its radio identity in an enquiry signal transmits a reply signal including its own radio identity, the in-range radio units identifying the transponding station and determining the received signal strength and relaying the radio identity of the transponding station, the determined received signal strength and its own identity to the interrogating station which relays the information to the central station which computes the location of the transponding station relative to the positions of the radio units.

According to a third aspect of the present invention there is provided a transponding unit comprising non-volatile storage means for storing the unit's radio identity, a radio receiver for receiving an enquiry signal, means for comparing the stored radio identity with a radio identity in the enquiry signal, and means responsive to the radio identities being considered to be substantially the same for activating a transmitter to send a reply signal having at least one characteristic different from the received enquiry.

The at least one characteristic may be the frequency of the reply signal being different from that of the enquiry signal or the signalling rate of the reply signal being different from that of the enquiry signal.

In implementing the system, the infrastructure may be a modified version of an installed wide area automatic metering system for use in measuring consumption of for example water, gas, electricity and/or heating water in domestic and business premises. Thus in urban areas the radio unit comprises the telecommunications part of a metering unit coupled to each of the premises which will enable a resolution equivalent to one dwelling to be obtained. The network interrogating stations are normally mounted in advantageous positions, for example on posts, from a radio communications point of view. In rural areas where the radio units may be dispersed less densely than in urban areas, the networK interrogating stations may function as radio units for the purpose of location finding and information is relayed to the central station by way of one or more intermediate network interrogation stations functioning as relay stations.

A transponding station may be physically small so that it can comprise an accessory which can be attached to clothing, especially children's clothing, or integrated into a container for an article or attached to the article. The transponder station is typically a transceiver which is able to receive an enquiry signal at one frequency and transmit a signal at another frequency.

BRIEF DESCRIPTION OF THE DRAWINGS

The present invention will now be described, by way of example, with reference to the accompanying drawings, wherein.

In the drawings, the same reference numerals have been used to indicate corresponding features.

DETAILED DESCRIPTION OF THE INVENTION

Figure 1:
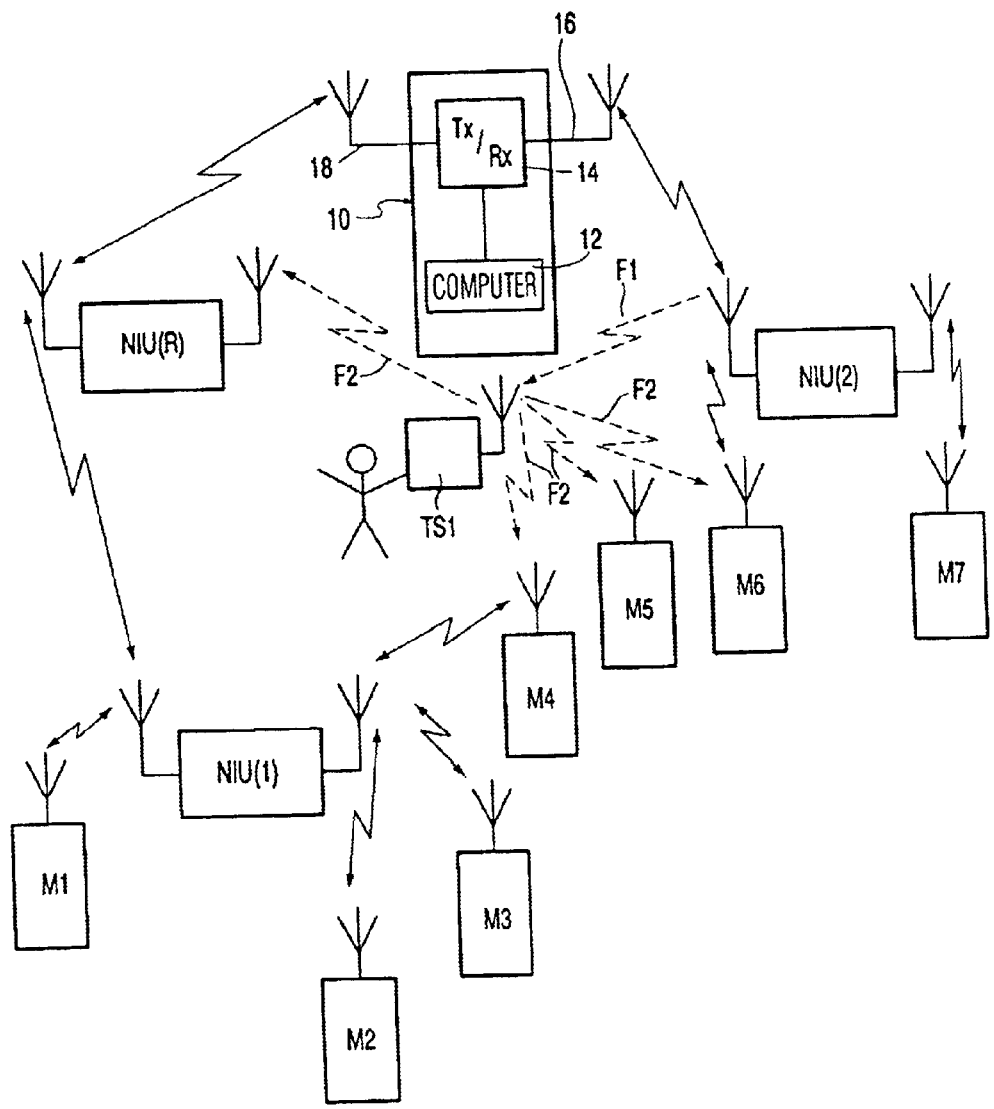
FIG. 1 is a diagrammatic of the embodiment of a location system.

The system shown in FIG. 1 comprises a central metering station 10, which comprises a large computer 12 and a transceiver 14 coupled to antennas 16, 18, which may provide antenna diversity. The computer 12 stores a map of the entire system.

A plurality of geographically distributed radio metering units M1 to M7, for example water metering units, are connected to each of the domestic and industrial premises receiving the particular commodity. As will be described later in greater detail, each metering unit comprises a radio transceiver coupled to an antenna which may be incorporated into the lid of a boundary box containing the meter or which may comprise a whip antenna suitably positioned to provide good signal reception and propagation The radio metering units are loosely arranged in clusters which are operatively associated with network interrogation units NIU (1) and NIU (2). Each of The network interrogation units includes a transceiver to enable it to receive messages from the metering units in its cluster and to relay messages to the central metering station 10. In certain cases, such as in rural environments, radio relay network interrogation units NIU (R) are provided. However, it is possible for NIU (1) and NIU (2) to provide a relay function when called upon to do so.

A transponder station TS1 is carried by a person, for example a child, or an article, for example a vehicle or package. Each transponder station comprises a transceiver and a store for storing a unique identity which is included in transmitted messages.

In operation as a metering system, the network interrogating units NIU (1) and NIU (2) interrogate individually the radio metering units M1 to M4 and M5 to M7 in their respective clusters and store the meter reading and the meter's identity. Alternatively, or additionally, The radio metering units may make their transmissions at random. From time to time, the central metering station 10 contacts the respective network interrogation units which download the stored meter readings and identifies. The transmission frequency or frequencies lie within an approved frequency band reserved for this purpose. For ease of illustration, it will be assumed that a single frequency F2 is used.

In one embodiment of a location finding mode, the central metering station 10 or a dedicated control centre (not shown) sends a short message including a unique address, such as "TS1", to some or all of the NIUs depending on the breath of the search. The NIUs transmit on a dedicated emergency channel F1 receivable by all the transponder stations "TS1 please transmit your ID on frequency F2". The frequency F2 is the customary frequency used for metering units to transmit to their NIU. The frequency F2 could be different depending upon the area, type of utility and company owning the meter reading system.

The transponding station TS1 responds to the above message by retuning its transmitter to the frequency F2 and transmits "TS1 responding". This message is received by in-range radio metering units and perhaps also by some interrogation units NIUs. The metering units measure the strength of the received signal. When interrogated by the interrogation unit poling in turn the metering units in its cluster, messages such as "Meter M1 has heard TS1 at signal level 56" and "Meter M2 has heard TS1 at signal level 23" are transmitted. The interrogation unit relays these messages to the central metering station 10, which using the map data stored in its data base can determine the location of the metering unit which received the message with the highest signal level. The relatively high density of metering units in an urban area will mean that the person, article or vehicle carrying the transponding station TS1 can be identified visually. If the transponder station is moved, then its movement can be tracked.

In another embodiment (not shown) the transponder stations receive and transmit on the same frequency, such as F1, and the radio metering units and some or all of the NIUs retune their transceivers to F1. The retuned condition may be maintained until another retune signal is received or the condition is timed-out and the radio metering units and NIU's retune themselves.

Figure 2:
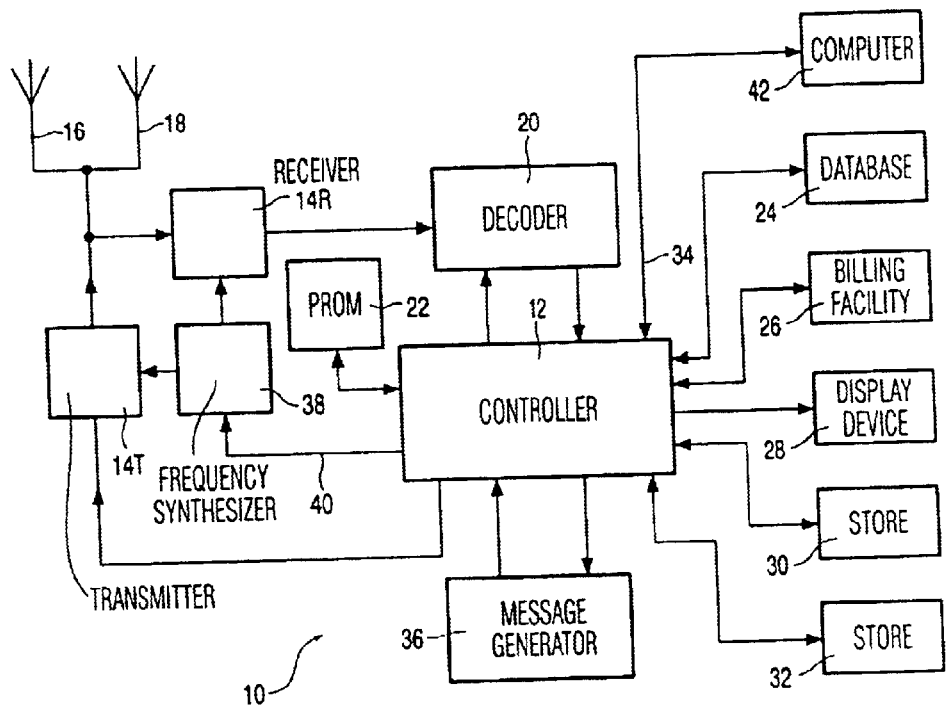
FIG. 2 is a block schematic diagram of a central metering station.

Referring to FIG. 2, the central metering station 10 comprises a receiver 14R having an input coupled to the antennas 16, 18 and an output coupled to a decoder 20. The decoder 20 is coupled to the controller 12, which operates in accordance with software stored in a PROM 22. Various facilities and databases are coupled to the controller 12. These include a data base of the locations of the interrogating units and the metering units, a billing facility 26 for compiling bills to be sent to consumers, a display device 28, a store 30 for storing the identifications of the interrogation units NIUs and radio metering units M1 to M7 and a store 32 for storing the identification of the transponding stations. The controller 12 has an input for external data which may De via the PSTN or a local personal computer generally represented by the block referenced 42.

If it is required that the central metering station 10 sends a message, it is generated in a stage 36. The message is relayed to a transmitter 14T which is coupled to the antennas 16, 18.

A frequency synthesiser 38 is coupled to the receiver 14R and the transmitter 14T. Its output frequency is determined by the controller and a set frequency signal is applied on an output 40. The receiver 14R and the transmitter 14T are able to be tuned over a range of frequencies in the assigned meter reading band.

Figure 3:
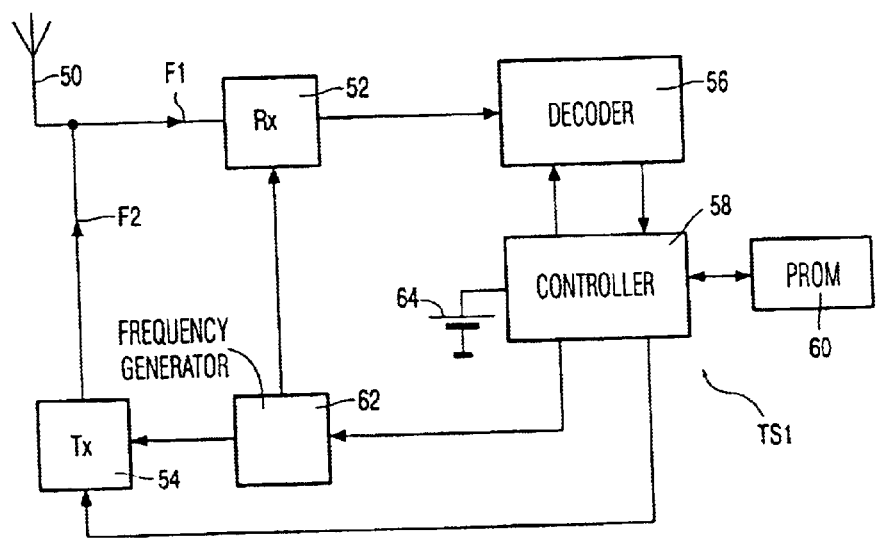
FIG. 3 is a block schematic diagram of a transponding station.

FIG. 3 illustrates an embodiment of the transponding station TS1, which comprises an antenna 50, which may be a loop antenna, coupled to a receiver 52 and a transmitter 54. The receiver 52 is coupled to a decoder 56 which in turn is coupled to a controller 58. If desired, the decoder 56 may be omitted and the decoding function is carried out by the controller 58 under software control. A PROM 60 (or a code plug) storing the transponding station's identity is coupled to the controller 58. In the embodiment in which the receive and transmit frequencies are the same, the required locally generated signals are produced using a fixed frequency generator 62, which is coupled to the receiver 52 and the transmitter 54. However, in the embodiment in which the transmit frequency, say F2, is different from the receive frequency, say F1, the frequency generator 62, is controlled to generate a local oscillator signal which will enable the receiver 52 to receive the frequency F1 and to generate a frequency which will enable the transmitter 54 to transmit on the frequency F2. Since the transponding station TS1 need only to be able to respond to a location enquiry signal, the controller 58 prestores an appropriate message with the station's identification being obtained from the PROM 60.

The transponding station TS1 is battery powered using a battery 64. In order To maximise the battery life, the receiver 52 is energised periodically in accordance with a battery saving protocol. It is convenient if the protocol used is compatible with the protocol used by the radio metering units. Thus, in order to ensure that the transponding station TS1 receives an enquiry message, the message has to be repeated over a time period equivalent to twice the normal on-period of the receiver 52 plus the off-period between two successive on-periods.

In the single frequency embodiment of the frequency generator 62, the local oscillator may have a low tolerance crystal and use the receive frequency F1 as a reference to pull the local oscillator frequency. An advantage of using F1 is that it is a relatively stable frequency and is unaffected by ageing of components of the transponding station TS1.

Figure 4:
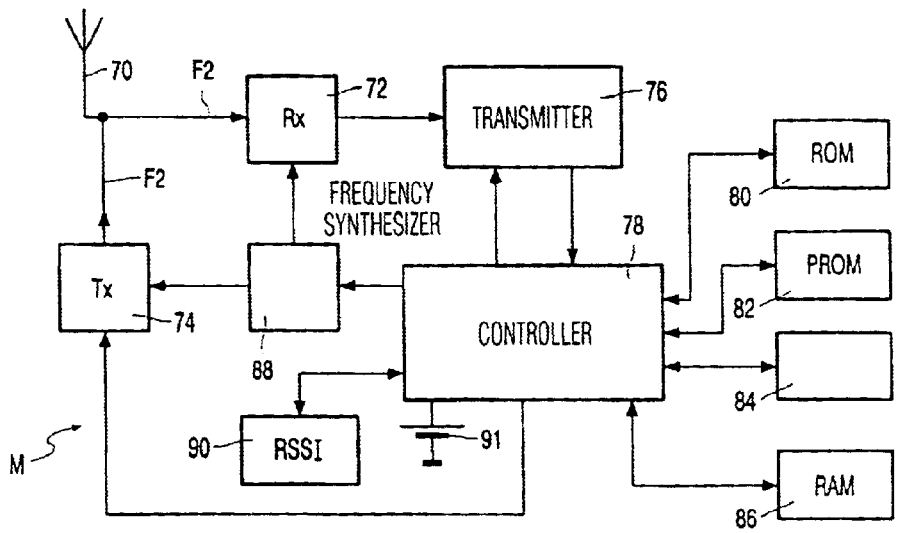
FIG. 4 is a block schematic diagram of a radio metering unit.

FIG. 4 shows an implementation of a radio metering unit M. An antenna 70 is coupled to a receiver 72 and a transmitter 74. The receiver 72 is coupled to a decoder 76 which in turn is coupled to a controller 78 operating in accordance with a program stored in a ROM 80. Also coupled to the controller 78 are a PROM storing the unit's identification, a metering unit 84, which provides a digital output representing the consumption of the resource, for example water, being measured, a RAM 86 for storing the consumption, a frequency synthesiser 88, received radio signal strength indication (RSSI) determining stage 90 and a battery 91. In normal operation, the metering unit M receives and transmits signals at the same frequency F2, but as different systems operate at other frequencies in the allocated metering band, the use of a frequency synthesiser 88 enables the receiver 72 and the transmitter 74 to be tuned to the desired channel. In the embodiment of the transponding station being a single frequency device, the frequency synthesiser 88 will enable the radio metering unit to be retuned as required and be retuned back again either in response to an instruction to retune or as a result of timing-out after being in a temporary retuned state.

An interrogation unit NIU is essentially the same a radio metering unit with the differences that it will not be connected to a metering unit, the PROM 82 will store all the metering unit identifications in the cluster and the RAM 86 will have sufficient capacity to store all the measurements being relayed.

The radio metering units and the interrogation units all practice battery economy in accordance with a suitable protocol such as that disclosed in WO-A-99/25051. In summary, the metering unit has a radio identity code consisting of M bits and the network interrogation unit NIU (or the central metering station, if applicable) transmits a wake-up message consisting at least two repetitions of a wake-up sequence, the wake-up sequence comprising N concatenated parts, where N is an integer, each of the N parts includes a sync code word and a different fraction M/N of bits of a radio identity code. The metering unit is energized intermittently in order to detect carrier and at least one of the N parts. In response to detecting that one of the N parts, the metering unit remains energized and analyses at least the detected one of the N parts. If the received bits of the radio identity code do not correspond to the corresponding bits of the metering unit's radio identity code, the metering unit reverts to its intermittent energization, otherwise it remains energized to receive a message appended to the transmitted radio identity code.

Figure 5:
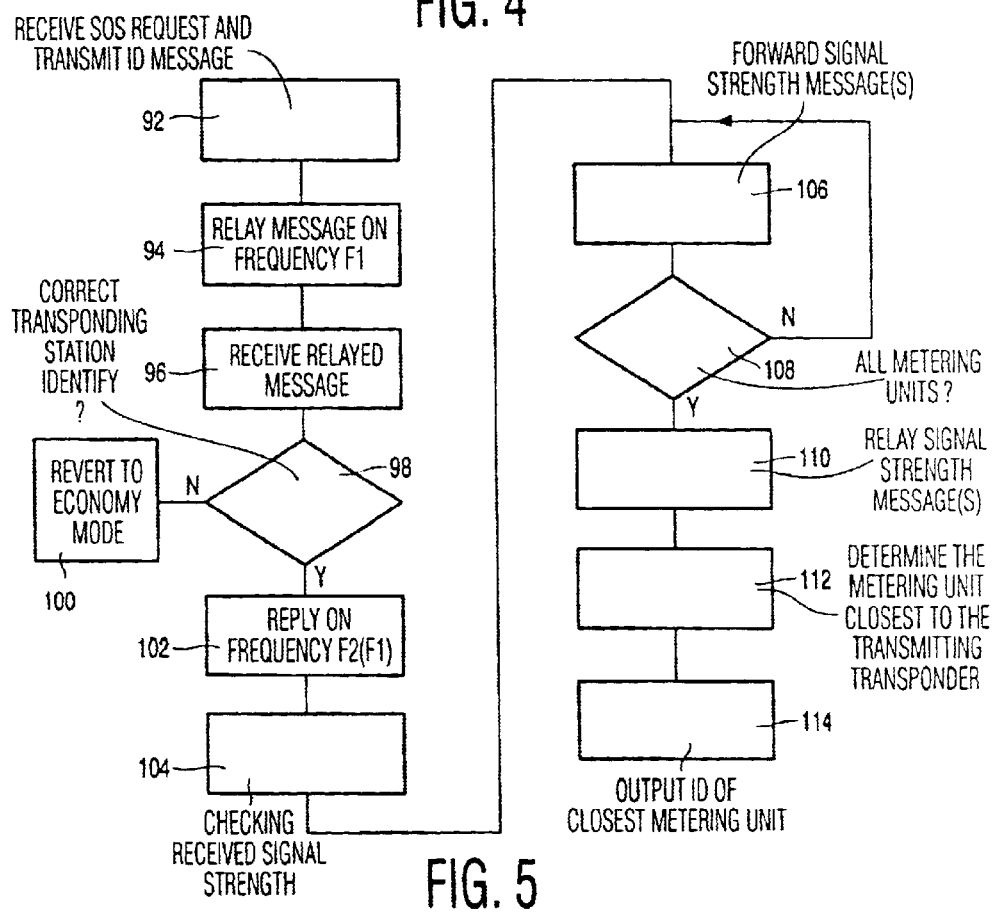
FIG. 5 is a flow chart showing the sequence of operations when conducting a location enquiry.

The flow chart shown in FIG. 5 commences with block 92 denoting the central metering station receiving an SOS request and transmitting a message identifying the transponding station. Block 94 relates to the interrogation units relaying the message on the frequency F1. Block 96 denotes the transponding stations receiving the relayed message. In Block 98 a check is made to see if the identity of the requested transponding station agrees with that allocated to the station. If the answer is yes (Y), the flow chart proceeds to block 102, which relates to the identified transponding station replying on frequency F2 (or F1). If the answer is no (N), the transponding station reverts to its battery economy mode.

Block 104 relates to in-range metering units receiving the response on F2 (or F1) and checking the received signal strength. Block 106 relates to the metering units forwarding their messages to the network interrogation unit either at random or in response to an invitation. Block 108 relates to checking to see if all the metering units in a cluster have responded or have been poled. If the answer is no (N) the flow chart reverts to the block 108 but if it is yes (Y) the flow chart proceeds to the block 110. This block denotes an interrogation unit relaying messages it has stored onto the central metering station. Generally this will be done in response to over-the-air invitations issued by the central metering station.

Block 112 denotes the central metering station receiving the messages and using the signal strength indications to determine the metering unit closest to the transmitting transponder. Block 114 relates to the central metering unit providing an output comprising the identification of the closest metering unit.

In order to minimize current consumption by the transponding station TS1 and the radio metering units, the metering units may be placed in a fast wake-up mode in which they are activated either continuously for a short time or more frequently than in their meter reading mode in order to be able to detect quickly a sequence of short messages transmitted by the transponding station TS1.

In a further non-illustrated embodiment, the central metering station and the network interrogation units have a separate dedicated emergency receiver that receives a message from a transponding station. A coarse determination of the location of the transponding station can be made and then the central metering station can put in hand a fine search based on using the radio metering units in the localized area determined by the coarse search.

In the present specification and claims, the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of radio location systems and component parts thereof and which may be used instead of or in addition to features already described herein.

What is claimed is:

1. A radio system, comprising:

a plurality of spatially separate radio units identifiable by a set of radio unit identifications, each radio unit including a first transceiver means and a received signal strength determining means;

an interrogating station including a second transceiver means for communicating with said radio units;

a central station including a third transceiver means for communicating with said interrogating station, said central station further including a storage means for storing a database including a location of each radio unit, and a transponding station identifiable by a transponding station identification, said transponding station including a fourth transceiver means for communicating with said radio units and said interrogating station, wherein, in response to an emergency request, said central station transmits an enquiry signal to said interrogating station, said enquiry signal including said transponding station identification, wherein said interrogating station rebroadcasts the enquiry signal to said transponding station and transmits individual wake-up messages to said radio units, each wake-up message including a corresponding radio unit identification, wherein, in response to receiving the wake-up messages, each radio unit is placed in a faster wake-up mode for determining a location of said transponder station than in a non-location determining mode, wherein, in response to hearing the transponding station identity in the enquiry signal, said transponding station transmits a reply signal to said radio units, the reply signal including the transponding station identity, wherein, in response to receiving the reply signal and being placed in the faster wake-up mode, each radio unit identifies said transponding station from the reply signal and determines a received signal strength of the reply signal, wherein said radio units and said interrogating station relay the transponding station identification and the determines received signal strengths of the relay signal together with the set of radio unit identifications to said central station, and wherein said central station computes the location of said transponding station relative to the location of each radio unit.

2. A method of operating a radio system including a plurality of spatially separate radio units, an interrogating station, a central station and a transponding station said method comprising:

transmitting an enquiry signal from the central station to the interrogating station in response to an emergency request, the enquiry signal including a transponding station identification corresponding to the transponding station;

transmitting the enquiry signal from the interrogating station to the transponding station;

transmitting individual wake-up messages from the interrogating station to each radio unit, each wake-up message including a corresponding radio unit identification;

placing each radio unit in a faster wake-up mode for determining a location of the transponder station than in a non-location determining mode:

transmitting a reply signal from the transponding station to the radio units in response to the transponding station hearing the transponding station identification in the enquiry signal and the radio units receiving the wake-up messages, the reply signal including the transponding station identity;

operating each radio unit to identify the transponding station from the reply signal and to determine a received signal strength of the reply signal in response to receiving the rely signal and being placed in the faster wake-up mode;

relaying the transponding station identification and the determined received signal strengths of the relay signal together with the set of radio unit identifications from the radio units and the interrogating station to the central station; and operating the central to compute the location of the transponding station relative to the location of each radio unit in response to receiving the transponding station identification and the determined received signal strengths of the relay signal together with the set of radio unit identifications.

* * * * *